United States Patent
Tanaka et al.

(10) Patent No.: US 7,324,255 B2
(45) Date of Patent: Jan. 29, 2008

(54) SPATIAL OPTICAL MODULATOR

(75) Inventors: Satoru Tanaka, Tsurugashima (JP);
Yoshihisa Itoh, Tsurugashima (JP);
Akihiro Tachibana, Tsurugashima (JP);
Yoshihisa Kubota, Tsurugashima (JP);
Kazuo Kuroda, Tsurugashima (JP);
Satoshi Sugiura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 72 days.

(21) Appl. No.: 10/521,312

(22) PCT Filed: Jul. 23, 2003

(86) PCT No.: PCT/JP03/09299

§ 371 (c)(1),
(2), (4) Date: Jan. 14, 2005

(87) PCT Pub. No.: WO2004/013707

PCT Pub. Date: Feb. 12, 2004

(65) Prior Publication Data

US 2005/0275919 A1 Dec. 15, 2005

(30) Foreign Application Priority Data

Aug. 5, 2002 (JP) .............................. 2002-227535

(51) Int. Cl.
*G02F 1/01* (2006.01)

(52) U.S. Cl. ...................... 359/245; 359/259; 359/315; 359/316; 359/10; 359/11; 345/695; 345/698; 369/103; 369/112.02

(58) Field of Classification Search .................. 359/10, 359/11, 259, 238, 245, 315, 316; 345/695, 345/698; 369/103, 112.01, 112.02; 396/103, 396/112.02
See application file for complete search history.

(56) References Cited

U.S. PATENT DOCUMENTS

| | | | |
|---|---|---|---|
| 5,107,351 A * | 4/1992 | Leib et al. ................... 359/11 |
| 5,805,136 A * | 9/1998 | Silverbrook et al. ........ 345/695 |
| 6,281,634 B1 | 8/2001 | Yokoyama | |
| 6,301,028 B1 | 10/2001 | Tanaka et al. | |
| 7,054,253 B1 * | 5/2006 | Nomura et al. ........ 369/112.02 |
| 2002/0154589 A1 | 10/2002 | Tanaka | |
| 2003/0043150 A1 | 3/2003 | Hwang | |

FOREIGN PATENT DOCUMENTS

| | | | |
|---|---|---|---|
| JP | 50-28268 B1 | | 9/1975 |
| JP | 63-142962 U | | 9/1988 |
| JP | 2-135425 | * | 5/1990 |
| JP | 2-135425 A | | 5/1990 |
| JP | 8-36188 A | | 2/1996 |
| JP | 2000-98862 A | | 4/2000 |
| JP | 2000-284672 A | | 10/2000 |

* cited by examiner

*Primary Examiner*—Hung X. Dang
*Assistant Examiner*—Joseph Martinez
(74) *Attorney, Agent, or Firm*—Sughrue Mion, Pllc.

(57) ABSTRACT

A spatial light modulator, in which light modulation elements are arranged in a same plane. In the spatial light modulator, a plurality of the light modulation elements are arranged such that there are at least two periods of periodic structure corresponding to an arrangement of the light modulation elements in an arbitrary direction in the plane where the light modulation elements are arranged.

8 Claims, 9 Drawing Sheets

SPATIAL OPTICAL MODULATOR

FIELD OF THE INVENTION

The present invention relates to a spatial light modulator and the like which are used in a hologram recording and reproducing apparatus and the like.

BACKGROUND ART

A volume holographic recording system is known as a digital information recording system using the principle of hologram. The feature of this system is to record an information signal in a recording medium as variations in a refractive index. In the system, photorefractive material such as lithium niobate single crystal and the like is used for the recording medium.

As one of hologram recording and reproducing methods, there is a method for recording and reproducing by use of Fourier transform.

Figure 1:
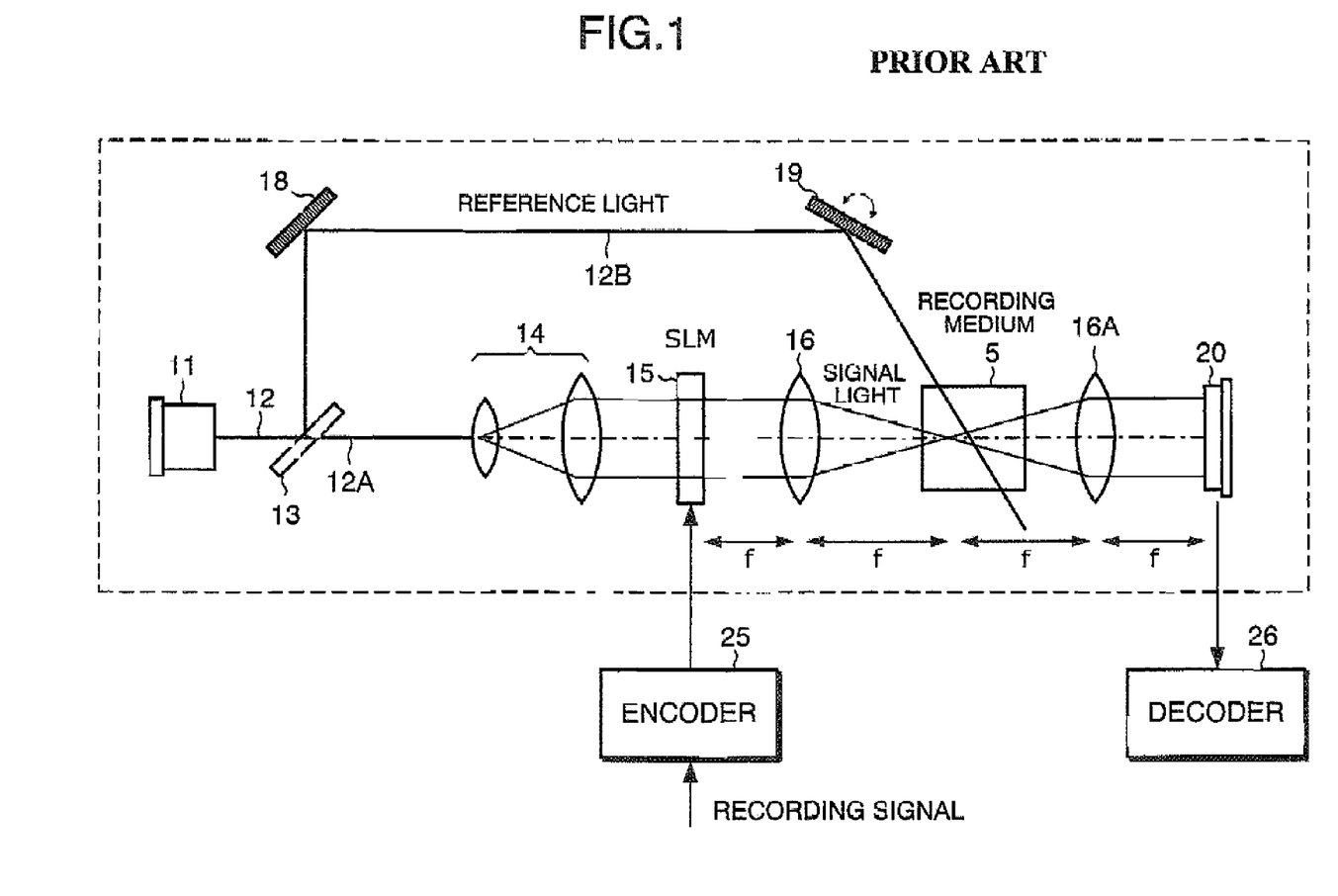
FIG. 1 is a diagram showing an example of a conventional hologram recording and reproducing apparatus.

FIG. 1 shows an example of a conventional hologram recording and reproducing apparatus. In this drawing, laser light 12 emitted from a laser light source 11 is divided into a signal light 12A and a recording reference light 12B by a beam splitter 13. The beam diameter of the signal light 12A is magnified by a beam expander 14, and the signal light 12A is applied to a spatial light modulator (SLM) 15 such as a panel of a translucent TFT liquid crystal display (LCD) and the like as collimated light. The spatial light modulator (SLM) 15 receives recording data converted by an encoder 25 as an electric signal, to form a bright and dark dot pattern on a plane. In passing through the spatial light modulator (SLM) 15, the signal light 12A is modulated to include a data signal component. When the signal light 12A including the signal component of the dot pattern passes through a Fourier transform lens 16, which is disposed a focal length "f" away, the signal component of the dot pattern is subjected to Fourier transform, and is condensed into the recording medium 5.

On the other hand, the recording reference light 12B divided by the beam splitter 13 is led into the recording medium (volume holographic memory) 5 by a mirror 18 and a mirror 19. The recording reference light 12B intersects with an optical path of the signal light 12A inside the recording medium 5 and forms a light-interference pattern, to record the whole light-interference pattern as variations in a refractive index.

The Fourier transform lens, as described above, forms an image from diffracted light of image data, which is illuminated by coherent collimated light. The image is converted into distribution on a focal plane, that is, on a Fourier plane, and the distribution as a result of Fourier transform is allowed to interfere with the coherent reference light, in order to record interference fringes on the recording medium in the vicinity of a focal point. After completing the recording of a single data page (hereinafter, also simply referred to as a "page"), the mirror 19 is rotated at a predetermined angle, and the position thereof is moved in parallel by a predetermined amount, in order to vary an incident angle of the recording reference light 12B with respect to the recording medium 5. Then, the second page is recorded in the same procedure. Angular multiplexing recording is carried out by successively performing the recording like this.

In reproducing operation, on the other hand, inverse Fourier transform is carried out to reproduce a dot pattern image. In reproducing data, as shown in FIG. 1, the optical path of the signal light 12A is interrupted by, for example, the spatial light modulator (SLM) 15, and only the reference light 12B is applied to the recording medium 5. During reproduction, the position and angle of the mirror 19 are varied and controlled with the use of the combination of the rotation and linear movement of the mirror 19 so that the incident angle of the recording reference light becomes the same as that in recording a page to be reproduced. Reproduction light which reproduces the recorded light-interference pattern appears on the opposite side of the recording medium 5 irradiated with the reference light 12B. A dot pattern signal can be reproduced by leading the reproduction light into an inverse Fourier transform lens 16A to carry out inverse Fourier transform. Then, the dot pattern signal is received by a photodetector 20 such as a charge-coupled device CCD and the like in the position of a focal length, to reconvert the dot pattern signal into an electric digital data signal. Then, the digital data signal is sent to a decoder 26, so that original data is reproduced.

In the hologram recording with Fourier transform, the first-order diffracted light becomes the highest frequency component of the signal light, which is Fourier transformed by the spatial light modulator 15 such as the LCD and the like, due to the repeats of pixels of the spatial light modulator 15.

Figure 2:
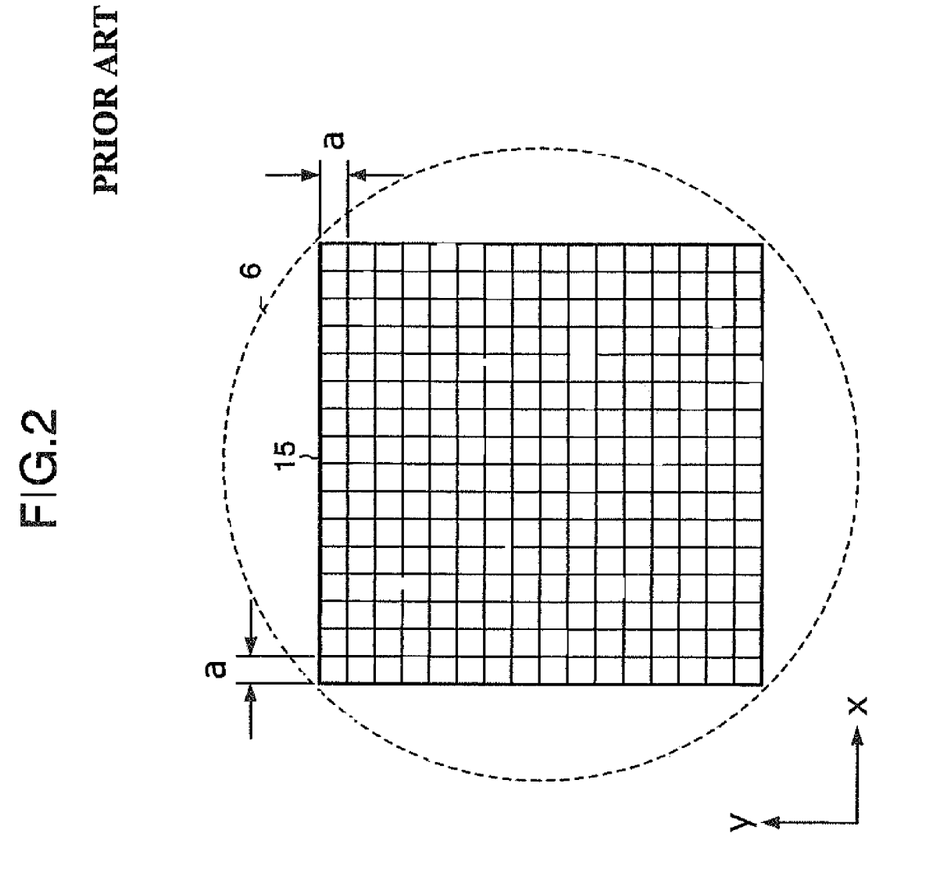
FIG. 2 is a plan view showing a pattern of a conventional spatial light modulator in which square pixels, a side of which has a length of "a", are arranged in a matrix.

FIG. 2 is a plan view showing a pattern of the conventional spatial light modulator 15. Square pixels a single side of which has a length of "a" (μm) are arranged in a matrix. In other words, a pixel pitch of the spatial light modulator 15 is "a" (μm). The reference numeral 6 indicates an incident beam which is incident on the spatial light modulator 15.

Figure 3:
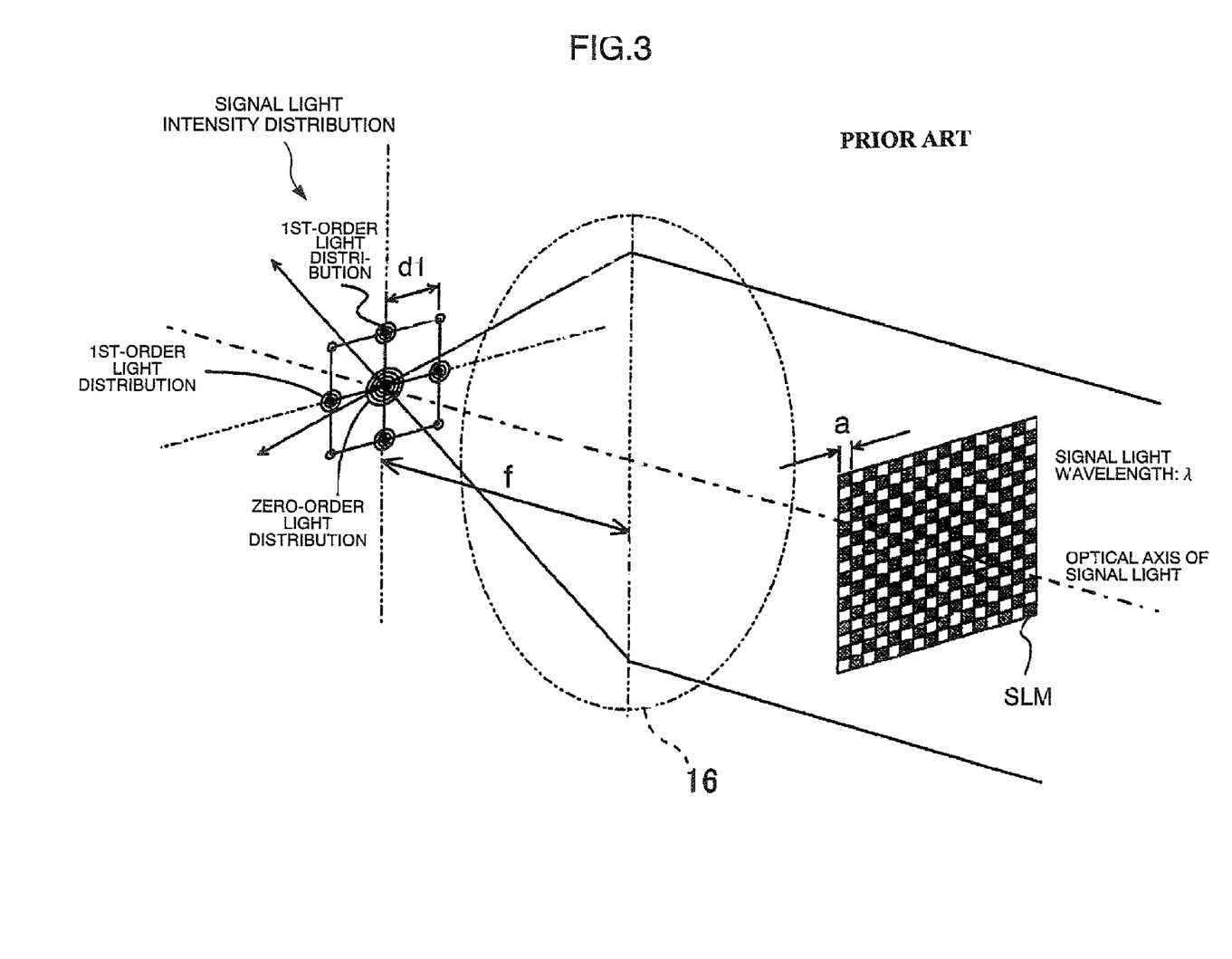
FIG. 3 is a diagram showing a light intensity of frequency spectrum, which occurs in an xy plane in parallel with a Fourier plane due to the interference between signal light and reference light.

Referring to FIG. 3, the optical axis of the signal light represents a Z direction, and the directions of columns and rows of the pixels in a plane perpendicular to the signal light represent X and Y directions, respectively. When the signal light interferes with the reference light to record inside the recording medium 5, light intensity distributions of spatial frequency spectrum occur in the XY plane, which is in parallel with the Fourier plane, symmetrically with respect to the optical axis of the signal light.

The hologram recording using a Fourier transform hologram has the advantages that hologram fits into spatially limited space, information is recorded in a distributed manner by use of Fourier transform, and the redundancy of recording can be increased. The distance (d1) between a zero-order Fourier spectrum and the first-order Fourier spectrum in the Fourier plane is expressed as follows, with the use of a spatial frequency (fsp) in a recording plane, the wavelength (λ) of light, and the focal length (F1) of the Fourier transform lens.

$$d1 = fsp \cdot \lambda \cdot F1$$

Since the pixel pitch of the spatial light modulator 15 is 42 μm, the wavelength is 532 nm, and the focal length is 165 mm, the Fourier spectrum distance (d1) of the corresponding highest frequency component is 2.1 mm, according to the foregoing equation. Thus, information to be recorded exists in a range of approximately ±2.1 mm on the optical axis. In other words, as shown in FIG. 3, two-dimensional data appearing in the spatial light modulator 15 is distributed over xy space (x, y≦±2d1) in a matrix with two rows and two columns, which is composed of the first-order diffracted light and zero-order light.

Therefore, a peak appears in a Fourier transformed image of the spatial light modulator 15, in accordance with the highest frequency component due to the pixel pitch. These peaks themselves do not bear any meaningful data. If these peaks occur in such a Fourier transformed image, the photorefractive effect of the recording medium becomes saturated in the above-mentioned peak position, so that there is a problem that nonlinear distortion tends to occur in a recorded image.

Also there is a method for offsetting the recording medium from the Fourier plane in order to secure a dynamic range during recording, but the method has the problems that time necessary for recording becomes long, an S/N ratio decreases, highly sensitive recording medium is needed, and the like.

Considering the foregoing problems, an object to be achieved by the present invention includes one example of the foregoing problems. In other words, an object of the present invention is to provide a spatial light modulator with high performance which can record with high sensitivity and less signal distortion.

SUMMARY OF THE INVENTION

In a spatial light modulator according to the present invention, a plurality of light modulation elements are arranged in one plane. The plurality of light modulation elements are arranged so that there are at least two periods of periodic structure corresponding to the arrangement of the light modulation elements in an arbitrary direction in the plane.

In a spatial light modulator according to the present invention, a plurality of light modulation elements are arranged in a circular light modulation region. The plurality of light modulation elements are arranged so that there are at least two periods of periodic structure corresponding to the arrangement of the light modulation elements in an arbitrary direction in the light modulation region. The size of the light modulation element increases along the outer peripheral direction of the light modulation region.

A spatial light modulator according to the present invention has a circular light modulation region. A light modulation element is disposed in each of areas which are obtained by radially and concentrically dividing the light modulation region.

MODE FOR CARRYING OUT THE INVENTION

Embodiments of the present invention will be described in detail with reference to the drawings. In the drawings described below, substantially identical parts are denoted by the same reference numerals.

FIRST EMBODIMENT

Figure 4:
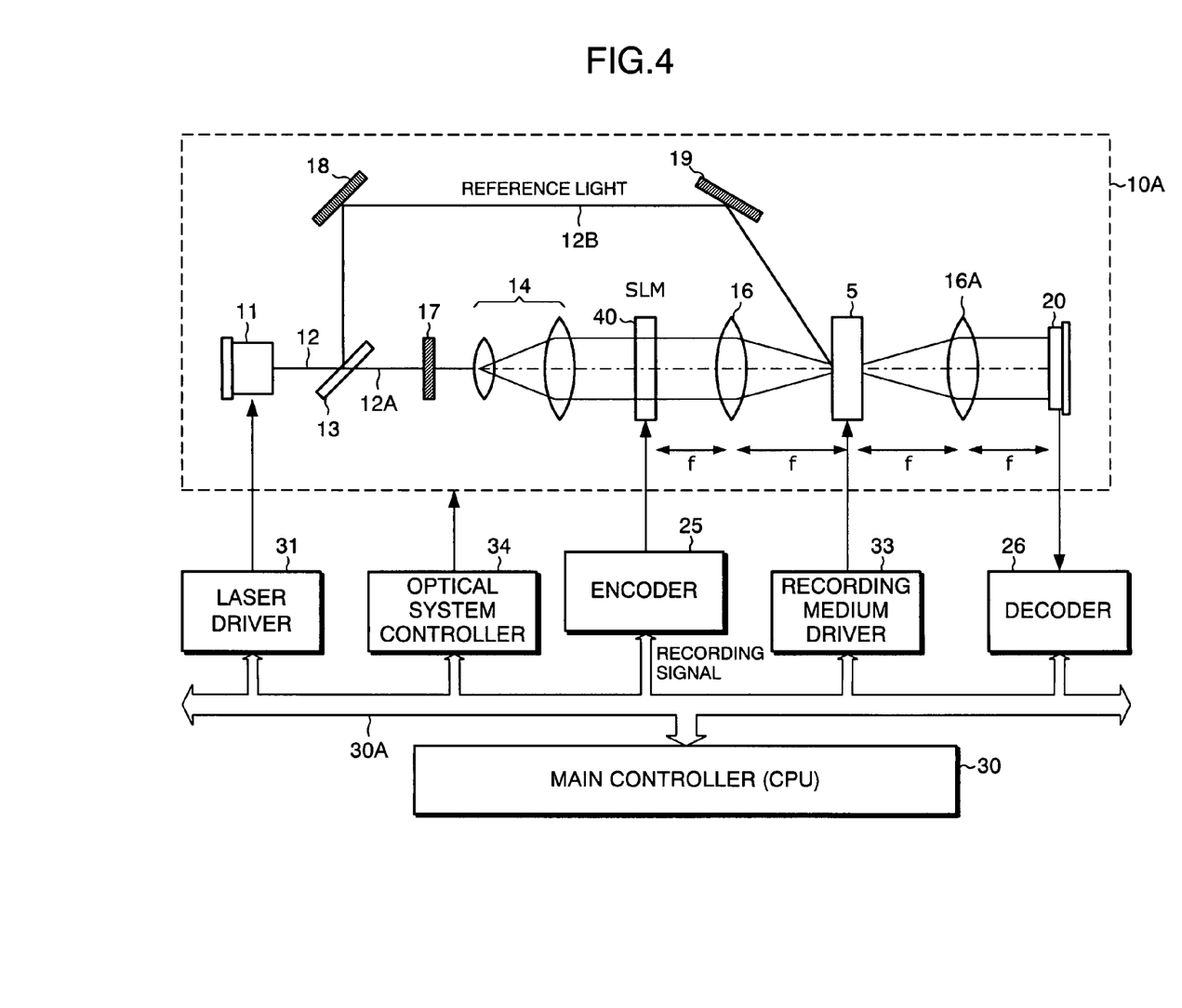
FIG. 4 is a block diagram showing the structure of a hologram recording and reproducing apparatus which uses a spatial light modulator according to a first embodiment of the present invention.

FIG. 4 is a block diagram showing the structure of a hologram recording and reproducing apparatus 10 which uses a spatial light modulator 40 according to a first embodiment of the present invention.

In an optical system 10A of the hologram recording and reproducing apparatus 10, for example, a solid-state laser for emitting green light with a wavelength of 532 nm is used as a light source of signal light 12A and recording reference light 12B. A laser light source 11 is driven by a laser driver 31. The laser driver 31 is controlled by a main controller (CPU) 30 connected to each circuit block of the hologram recording and reproducing apparatus 10 to carry out the control of the whole apparatus. More specifically, various control signals including a write timing signal and the like is supplied from the main controller 30 to the laser driver 31, and the laser driver 31 drives the laser light source 11 on the basis of the control signals.

Laser light 12 emitted from the laser light source 11 is divided into the signal light 12A and the recording reference light 12B by a beam splitter 13. A beam expander 14 magnifies the beam diameter of the signal light 12A, and the signal light 12A is incident on the spatial light modulator (SLM) 40, which comprises a panel of a translucent TFT liquid crystal display (LCD), as collimated light.

A plurality of light modulation elements are arranged in the spatial light modulator (SLM) 40, in such a manner that there are at least two periods of periodic structure which corresponds to the arrangement of the light modulation elements in an arbitrary direction in a plane. In other words, the light modulation elements are arranged so that there are at least two peak components of a Fourier frequency in a Fourier plane corresponding to the arrangement of the light modulation elements.

Figure 5:
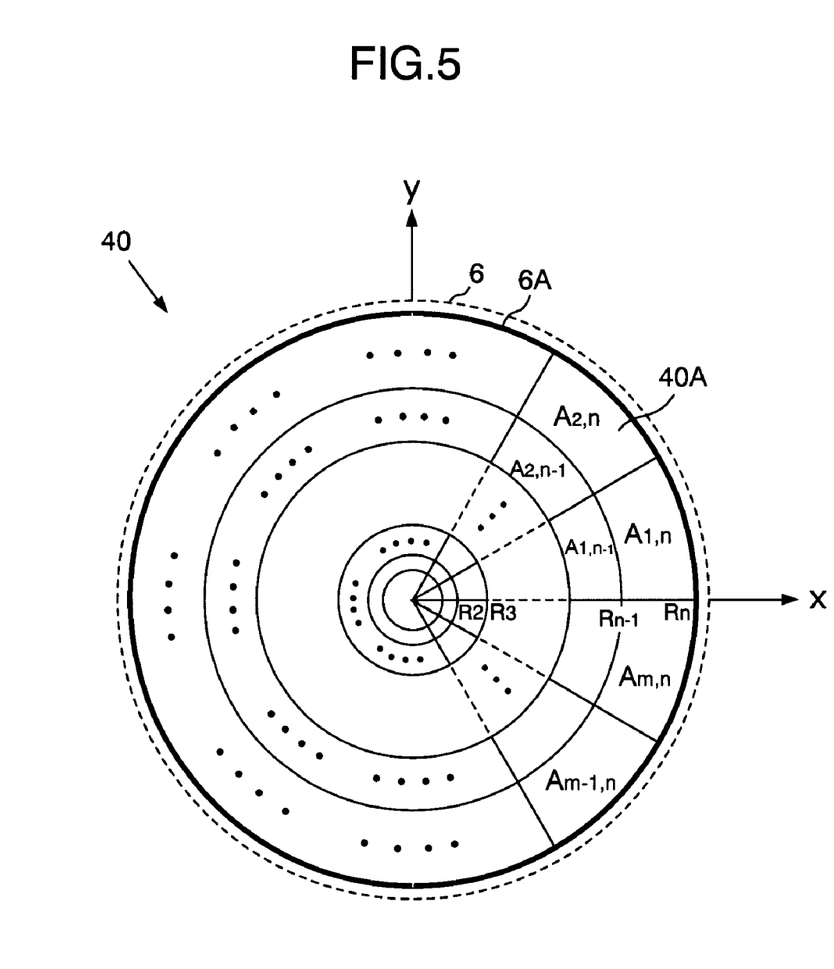
FIG. 5 is a schematic plan view showing the shapes of light modulation elements in the spatial light modulator according to the first embodiment of the present invention.

In this embodiment, as shown in a plan view of FIG. 5, the spatial light modulator (SLM) 40 has a circular light modulation region or area 6A which is approximately inscribed with the beam diameter 6 of the signal light. The light modulation region 6A is divided every predetermined angle (θ) by radial partition lines passing through the center of the circle. The light modulation region 6A is also concentrically divided by partition lines the radiuses of which are $R_1$, $R_2$, ..., $R_n$. Each divided area corresponds to a light modulation element (hereinafter, also referred to as pixel) 40A, and hence the spatial light modulator 40 comprises pixels $A_{k,1}$, $A_{k,2}$, ..., $A_{k,n}$ (k=1, 2, ..., m). Therefore, the spatial light modulator 40 comprises n×m pixels.

Figure 6:
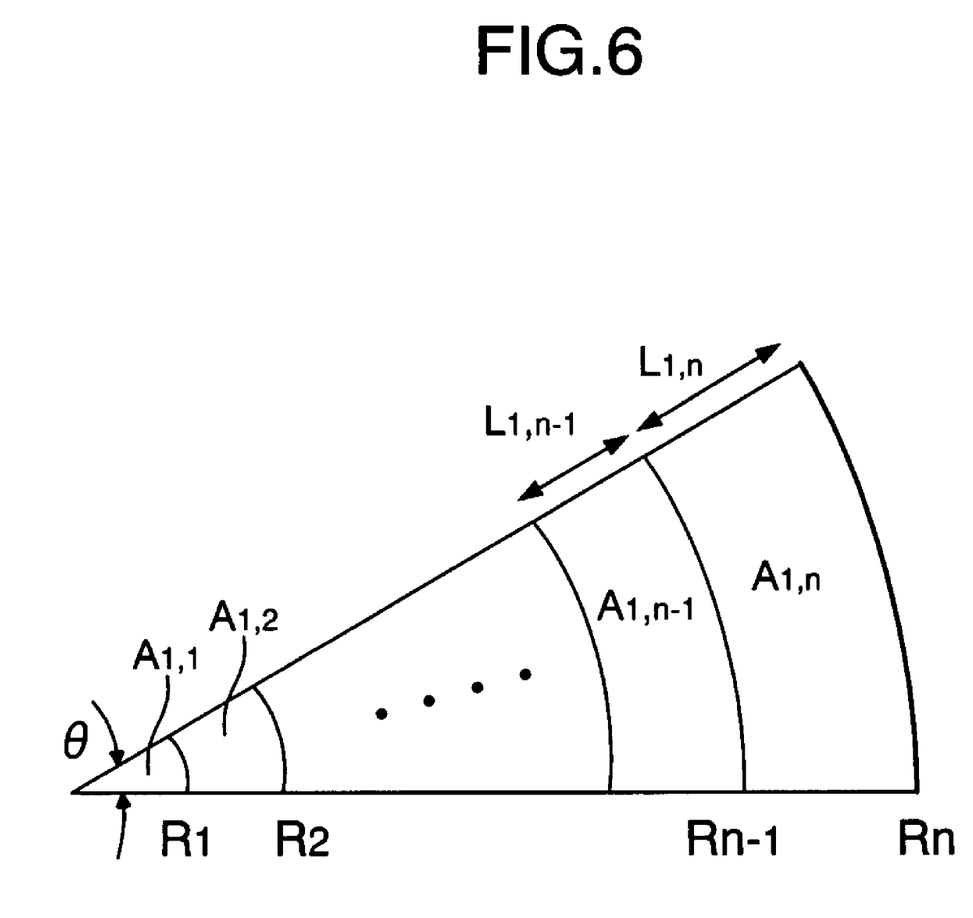
FIG. 6 is a partly enlarged view of the spatial light modulator shown in FIG. 5.

Taking a case of k=1, for example, as shown in a partly enlarged view of FIG. 6, each of the pixels $A_{1,1}$, $A_{1,2}$, ..., $A_{1,n}$ is configured so as to have a different pitch in a radial direction. It is preferable that no pixel has the same pitch. If the pixels are configured so that the reciprocals of the pitches are the approximately same values, the distance between Fourier spectra can be evenly distributed. By configuring the spatial light modulator 40 in this manner, the distance between Fourier spectra each of which corresponds to each pixel differs in the Fourier plane, so that it is possible to prevent a peak from occurring in a specific position in a Fourier transformed image.

Furthermore, in this embodiment, pixels with high spatial frequencies, i.e., small pixels are arranged in a central portion, and pixels with low spatial frequencies, i.e., large pixels are arranged in a peripheral portion, in order to effectively obtain an amount of incident light on a lens. In other words, the length $L_{1,j}$ (j=1, 2, ..., n) of each pixel $A_{1,1}$, $A_{1,2}$, ..., $A_{1,n}$, in a radial direction becomes long as the pixel approaches the peripheral portion (as j increases).

Furthermore, the size of each pixel $A_{1,1}$, $A_{1,2}$, ..., $A_{1,n}$ is determined in accordance with the power density of a signal light beam. In other words, when the signal light beam has the shape of Gaussian distribution, the power density is high in the central portion of the beam, and decreases with approaching the peripheral portion of the beam. Thus, the size of each pixel is determined so that the power of light incident on each pixel becomes substantially equal. The size of each pixel may be determined so that a ratio of the power of light incident on each pixel is within a predetermined range.

The spatial light modulator (SLM) 40 forms a bright and dark pattern on the basis of a data signal to be recorded. To be more specific, an encoder 25 receives the recording data signal which comprises a one-dimensional digital signal sequence, to convert the signal into a two-dimensional data array in accordance with the pixel array of the foregoing spatial light modulator (SLM) 40. Furthermore, the encoder 25 adds an error correction code to the two-dimensional data array, and generates a two-dimensional data signal (a unit page series data signal). The encoder 25 is provided with an SLM driver (not illustrated). The SLM driver generates a driving signal on the basis of the two-dimensional data signal, to drive the spatial light modulator (SLM) 40. Therefore, a two-dimensional pattern is formed in the spatial light modulator (SLM) 40 in accordance with the two-dimensional data signal.

When the signal light 12A passes through the spatial light modulator (SLM) 40, it is subjected to light modulation with the pattern. In other words, the spatial light modulator 40 has a modulation processing unit which corresponds to a unit page. The spatial light modulator 40 turns on or off the light of an applied coherent signal beam with a wavelength of 532 nm pixel-by-pixel, in accordance with unit page series data from the encoder 25, in order to generate a modulated signal light beam. To be more specific, the spatial light modulator 40 passes the signal beam when a logical value of unit page series data, being an electric signal, is "1", and intercepts the signal beam when the logical value is "0." Thus, electro-optic conversion is accomplished in accordance with the contents of each bit in unit page data, and hence the modulated signal light beam (signal beam) is generated as signal light of a unit page series.

The signal light 12A including the recording data signal passes through a Fourier transform lens 16 which is disposed a focal length "f" away, and the pattern signal component is subjected to Fourier transform to be condensed into the recording medium 5.

The recording reference light 12B divided through the beam splitter 13, on the other hand, is led into a recording medium (volume holographic memory) 5 by a mirror 18 and a mirror 19. The recording reference light 12B intersects with an optical path of the signal light 12A inside the recording medium 5 and forms a light-interference pattern, to record the whole light-interference pattern as variations in a refractive index.

The Fourier transform lens, as described above, forms an image from diffracted light from the spatial light modulator, which is illuminated by coherent light and modulated with image data. The image interferes with the coherent reference light, and interference patterns are recorded in the recording medium in the vicinity of a focal point. Upon completing the recording of a single data page (hereinafter, also simply referred to as "page"), a recording medium driver 33 moves the position of the recording medium 5 in parallel by a predetermined amount, and the second page is recorded in the same procedure. Recording is carried out by successive recording like this.

In reproducing, on the other hand, the image is reproduced by carrying out inverse Fourier transform. In the reproduction of data, for example as shown in FIG. 4, after the recording medium driver 33 moves the recording medium 5 to a predetermined position, a shutter 17 or the spatial light modulator (SLM) 40 interrupts the optical path of the signal light 12A, so that only the reference light 12B is incident in the recording medium 5. Thus, reproduction light is reproduced from the recorded light-interference pattern. A pattern signal is reproduced by leading the reproduction light into an inverse Fourier transform lens 16A and carrying out inverse Fourier transform. Then, after the pattern signal received by a photodetector 20 such as a charge-coupled device (CCD) and the like is reconverted into an electric digital data signal, the digital data signal is sent to the decoder 26 in order to reproduce recorded data.

According to the present invention, it is possible to reduce the intensity of the light peak occurring in the Fourier transformed image, which is caused by the periodic structure of the spatial light modulator. Thus, it is possible to prevent the photorefractive effect of the recording medium from being saturated. Therefore, it is possible to provide a spatial light modulator with high performance, by which nonlinear distortion is hard to occur and hologram recording is carried out with high sensitivity.

SECOND EMBODIMENT

Figure 7:
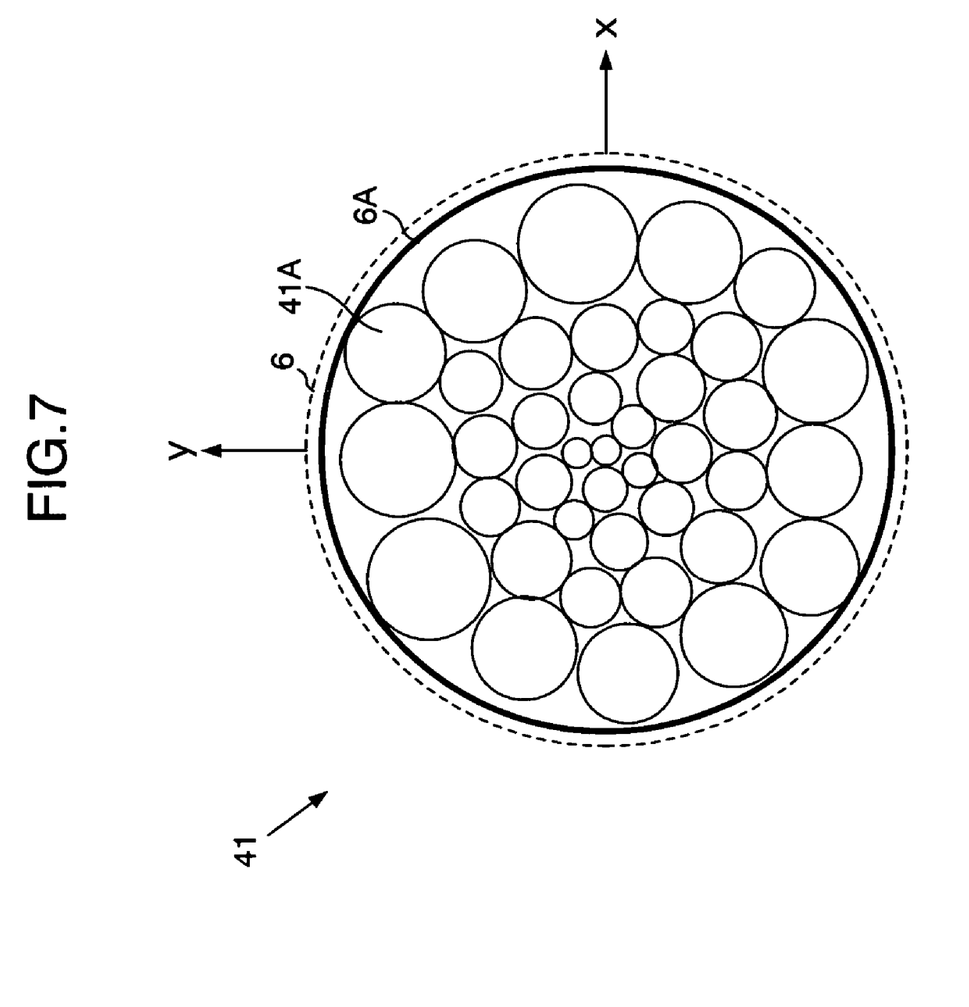
FIG. 7 is a schematic plan view showing the structure of a spatial light modulator according to a second embodiment of the present invention.

FIG. 7 is a schematic plan view showing the structure of a spatial light modulator 41 according to a second embodiment of the present invention. The spatial light modulator 41 comprises a panel of a transmission-type TFT liquid crystal display (LCD).

As shown in the plan view of FIG. 7, the spatial light modulator (SLM) 41 comprises a plurality of light modulation elements (pixels) 41A, each of which has the shape of a circle. The plurality of pixels 41A are arranged in the plane of the spatial light modulator 41, in such a manner as to satisfy any one of the following conditions.

(1) The pixels 41A are arranged so that spatial frequencies by the pixels 41A in an arbitrary line in the plane of the spatial light modulator 41 become plural, or
(2) The plurality of pixels 41A have random sizes, or
(3) The pixel with a high spatial frequency, i.e., the small pixel is arranged in a central portion, and the pixel with a low spatial frequency, i.e., the large pixel is arranged in a peripheral portion.

The pixels may be arranged so as to satisfy a plurality of the foregoing conditions. In this embodiment, the pixels are arranged so as to satisfy all of the foregoing conditions (1) to (3).

It is preferable that the size of each pixel is determined in accordance with the power density of a signal light beam. Namely, when the signal light beam density has the shape of Gaussian distribution, the power density is high in the central portion of the beam, and decreases with approaching the peripheral portion of the beam. Therefore, the size of each pixel may be determined so that a ratio of the power of light incident on each pixel is within a predetermined range.

Figure 8:
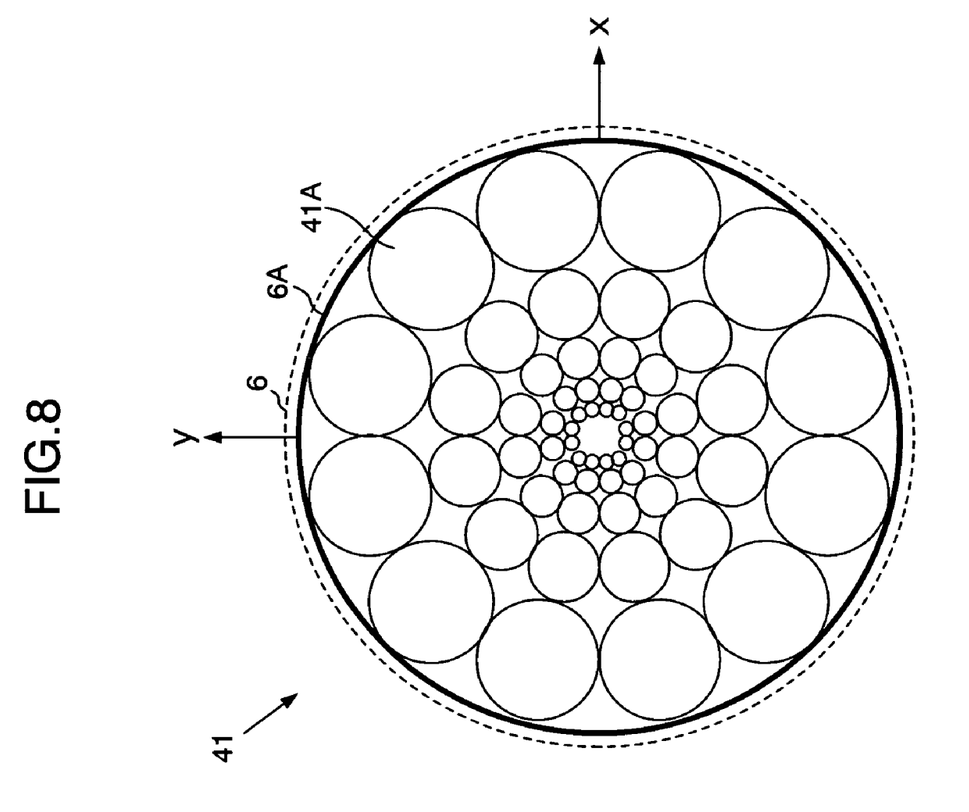
FIG. 8 is a schematic plan view showing the structure of a spatial light modulator with circular light modulation elements according to another embodiment of the present invention.

FIG. 8 is a schematic plan view showing another embodiment of the spatial light modulator 41 according to the present invention. Each light modulation element (pixel) 41A has the shape of a circle, and the size of each pixel increases toward the outer peripheral direction of the light modulation region 6A.

Figure 9:
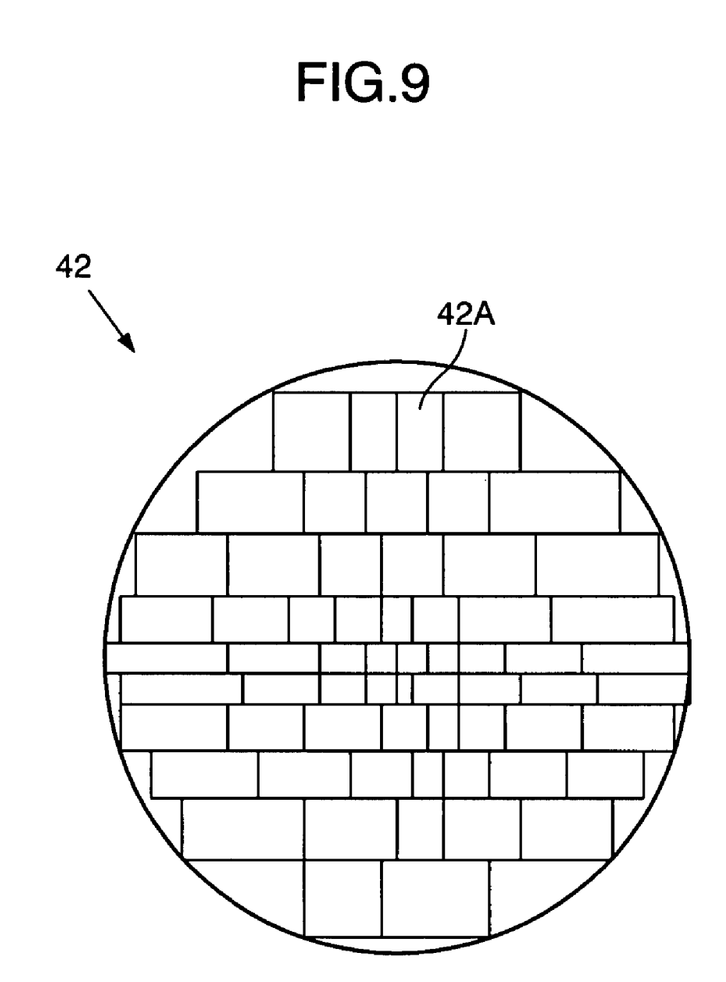
FIG. 9 is a schematic plan view showing the structure of a spatial light modulator with rectangular light modulation elements according to further another embodiment of the present invention.

Each pixel does not need to be in the shape of a circle. As shown in FIG. 9, a spatial light modulator 42 may comprise rectangular pixels 42A. In this embodiment, the pixels 42A are arranged so as to satisfy all of the foregoing conditions (1) to (3).

Furthermore, every pixel does not need to be in the same shape. In other words, it is unnecessary that all pixels have the shape of a circle or a rectangle, and pixels in random shapes may be arranged.

According to such a structure, since light peak intensity occurring in the Fourier transformed image is reduced, it is possible to prevent the photorefractive effect of the recording medium from being saturated. Therefore, it is possible to provide a spatial light modulator with high performance, by which nonlinear distortion is hard to occur and hologram recording is carried out with high sensitivity.

What is claimed is:

1. A spatial light modulator for use in hologram recording, in which a plurality of light modulation elements are arranged in one plane to modulate a light beam incident thereon, wherein:
   said plurality of light modulation elements are configured to perform light modulation in accordance with two-dimensional data corresponding to a recording data signal, and
   said plurality of light modulation elements are arranged such that there are at least two Fourier frequency components corresponding to distances of the light modulation elements in an arbitrary direction in said one plane.

2. The spatial light modulator according to claim 1, wherein said plurality of light modulation elements perform light intensity modulation.

3. A spatial light modulator for use in hologram recording, in which a plurality of light modulation elements are arranged in a light modulation region of a circular shape to modulate a light beam incident thereon, wherein:
   said plurality of light modulation elements are configured to perform light modulation in accordance with two-dimensional data corresponding to a recording data signal, and
   said plurality of light modulation elements are arranged such that there arc at least two Fourier frequency components corresponding to distances of the light modulation elements in an arbitrary direction in said light modulation region, and sizes of the light modulation elements increases along an outer peripheral direction of said light modulation region.

4. The spatial light modulator according to claim 3, wherein said plurality of light modulation elements have areas such that the ratios of light powers incident on the respective light modulation elements fall within a predetermined range.

5. The spatial light modulator according to claim 3, wherein said plurality of light modulation elements perform light intensity modulation.

6. A spatial light modulator for use in hologram recording and having a light modulation region of a circular shape to modulate a light beam incident thereon, comprising:
   a plurality of light modulation elements arranged in areas which are obtained by radially and concentrically dividing said light modulation region, said plurality of light modulation elements being configured to perform light modulation in accordance with two-dimensional data corresponding to a recording data signal,
   wherein said plurality of light modulation elements are positioned such that there are at least two Fourier frequency components corresponding to distances of the light modulation elements in a radial direction of said light modulation region.

7. The spatial light modulator according to claim 6, wherein said plurality of light modulation elements have areas such that the ratios of light powers incident on the respective light modulation elements fall within a predetermined range.

8. The spatial light modulator according to claim 6, wherein said plurality of light modulation elements perform light intensity modulation.

* * * * *